United States Patent
Schlener et al.

(10) Patent No.: US 6,182,157 B1
(45) Date of Patent: *Jan. 30, 2001

(54) FLEXIBLE SNMP TRAP MECHANISM

(75) Inventors: Cynthia Schlener, Phillipson; Shaila Vasudev, Acton, both of MA (US)

(73) Assignee: Compaq Computer Corporation, Houston, TX (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/710,563

(22) Filed: Sep. 19, 1996

(51) Int. Cl.[7] .................................................. G06F 9/46

(52) U.S. Cl. .......................... 709/318; 709/202; 709/224

(58) Field of Search ..................... 395/200.53, 200.54; 709/202, 224, 318

(56) References Cited

U.S. PATENT DOCUMENTS

| | | | |
|---|---|---|---|
| 4,023,163 | * 5/1977 | Krishnaiyer et al. | 340/409 |
| 5,367,670 | * 11/1994 | Ward et al. | 395/575 |
| 5,436,909 | 7/1995 | Dev et al. | 371/20.1 |
| 5,448,724 | 9/1995 | Hayashi | 395/182.02 |
| 5,491,796 | 2/1996 | Wanderer et al. | 395/200.09 |
| 5,751,965 | * 5/1998 | Mayo et al. | 395/200.54 |
| 5,764,886 | * 6/1998 | Danielson et al. | 395/184.01 |

FOREIGN PATENT DOCUMENTS

WO 95/12291   5/1995   (WO) .............................. H04Q/3/66

OTHER PUBLICATIONS

Stallings, W., "SNMP, SNMP2 and CMIP: The Practical Guide to Network Management Standards," pp. 189–191, Addison–Wesley, 1993.

Lake, C., "Remote (Network) Monitoring (RMON)," RPM Associates, Inc. World Wide Web page, http://www.rpm.com/whitepaper/rmon.html, availability date listed as Jul. 18, 1995.

Waldbusser, S., "Remote Network Monitoring Management Information Base," RFC 1757, Feb., 1995.

Design for a Simple Network Management Protocol Subagent for Internet Firewalls; IBM Technical Disclosure Bulletin; vol. 40, No. 3; Mar. 1, 1997, pp. 63–68.

Catania, V. et al.; Monitoring Performance in Distributed Systems; Computer Communications; vol. 19, No. 9, Aug. 1, 1996, pp. 788–803.

Marc Schwager; Remote Network Monitoring MIB; Annual Review of Communications; vol. 46; Jan. 1, 1992, pp. 752–754.

(List continued on next page.)

Primary Examiner—Zarni Maung
Assistant Examiner—Gary Scott Fourson
(74) Attorney, Agent, or Firm—Hamilton, Brook, Smith & Reynolds, PC

(57) ABSTRACT

An alarm monitoring apparatus and method allows a user of a management station to dynamically create and flexibly configure SNMP traps based on any management information base variable without having to define an exhaustive set of trap definitions in a management information base. Apparatus for monitoring status of a network device includes a processor assembly coupled to the network device and a data memory member accessible by the processor assembly for indicating user-defined alarm thresholds of the subject device. The processor assembly obtains threshold data from the data memory member and compares current status to the obtained threshold data. Upon a threshold being met by the current status, the processor assembly transmits an indication of threshold condition of the subject device to a system management station across a network. The data memory member is a database formed of a plurality of records defined by a management information base.

8 Claims, 6 Drawing Sheets

OTHER PUBLICATIONS

Waldbusser, S.; Remote Network Monitoring Management Information Base; IETF RFC 1757; Carnegie Mellon University; Feb. 1995.

Rose, M., "Structure and Identification of Management Information for TCP/IP–based Internets", RFC 1155, May, 1990.

McCloghrie, K., "Management Information Base for Network Management of TCP/IP–based internets", RFC 1156, May, 1990.

Case, J., "A Simple Network Management Protocol (SNMP)", RFC 1157, May, 1990.

* cited by examiner

FLEXIBLE SNMP TRAP MECHANISM

BACKGROUND OF THE INVENTION

The invention relates generally to network management, and more particularly to remote alarm threshold and status monitoring of network elements.

Network management systems are employed to monitor, interpret, and control the operations of a network. In a typical network management system, network devices (e.g., servers, gateways, hosts) are provided with agent software (an "agent") that monitors and accumulates operational data and detects exceptional events. A management station includes management software (a "manager") at the application level which requests operational data or receives event notifications from the agent using management protocols. The management station is further equipped to interpret the operational data and event information to effect control of the network operations.

Simple Network Management Protocol (SNMP) (J. Case et al., "A Simple Network Management Protocol", RFC 1157, May 1990) defines a standard protocol for the communication of management information. SNMP specifies the format and meaning of messages exchanged between managers and agents and the representation of names and values in those messages. A virtual information store, termed a Management Information Base (MIB) (K. McCloghrie and M. Rose, "Management Information Base for Network Management of TCP/IP-based Internets", RFC 1156, May 1990), defines the management data or objects by specifying the data variables a network device must keep, including the names of the data variables and the syntax used to express those names. For example, the MIB may specify data variables which track statistics on the status of network interfaces, incoming and outgoing datagrams, and the number of routing failures. The rules used to define and identify MIB data variables are provided by the Structure of Management Information (SMI) specification (M. Rose and K. McCloghrie, "Structure and Identification of Management Information for TCP/IP-based Internets", RFC 1155, May 1990). Each managed data variable or object has a name known as an object identifier which specifies an object type. The object type together with an object instance uniquely identifies a specific instantiation of the object. For convenience, a text string known as an object descriptor is used to refer to the object type.

SNMP uses a fetch-store paradigm to effect operations between a manager and agent. Specifically, SNMP defines get-request, get-next-request, get-response, and set-request commands which provide the basic fetch and store operations. In addition, SNMP defines a trap command by which an agent asynchronously sends information to a manager triggered by an event. Thus, a management station requests operational data or receives event notifications by means of this simple set of SNMP commands.

A limitation of known MIB structures is that trap definitions are predefined in the MIB. For any particular MIB, traps are defined which trigger when specific conditions are met. Since the traps are predefined at the time the MIB is designed, a network management station typically must poll the network device for values of MIB variables not specified in a defined trap. Polling across the network is undesirable since it adds to network traffic. To provide for more extensive monitoring of events without having to poll, a MIB could be designed to include additional predefined trap definitions, one for each combination of variables. However, for large MIBs, the number of variables needed can be prohibitive for this approach. Further, since the traps are predefined, a user of the management station does not have the option of turning certain traps on and off.

An improvement on predefined MIBs is the Remote MONitor (RMON) MIB (S. Waldbusser, "Remote Network Monitoring Management Information Base", RFC 1757, February 1995) which provides a way to define traps. The RMON MIB includes an alarm group of objects which periodically takes statistical samples from data variables and compares them with preconfigured thresholds. An alarm table in the RMON MIB specifies configuration entries that each define a variable and associated threshold parameters. An event is generated and a trap is sent when it is determined that a sample has crossed a threshold value. Two thresholds are provided: a rising threshold and a falling threshold. The rising threshold is crossed if the value of the current sample is greater than or equal to the rising threshold. Likewise, a falling threshold is crossed if the current sample value is less than or equal to the falling threshold. To limit the generation of traps, the RMON MIB includes a hysteresis mechanism. According to the hysteresis mechanism, one trap is sent as a threshold is crossed in the appropriate direction. No additional traps are sent for that threshold until the opposite threshold is crossed.

However, the RMON MIB is limited in the variables that it supports and the conditions that it can specify for generating a trap. While the RMON MIB supports thresholding on statistical values (e.g., the number of packets or collisions counted for a monitored interface), it has limitations on trapping multistate or enumerated status variables. For example, a status variable for a device typically may have multiple states defined, such as "unknown", "running", "warning", "testing", and "down". Each state is represented in the MIB object syntax by a different integer value, e.g., unknown=1, running=2, warning=3, testing=4, and down=5. Since the RMON MIB only supports thresholding using "greater than or equals to" and "less than or equals to" comparisons, thresholding for a particular state of a multistate status variable is difficult and cumbersome.

SUMMARY OF THE INVENTION

A need exists for a mechanism for defining a trap in a more extensible and flexible manner on any managed variable, whether a threshold or a status variable.

The above and other problems are solved by the alarm monitoring apparatus and method of the present invention. The present invention provides a mechanism for allowing a user of a management station to dynamically create and flexibly configure a trap based on any MIB variable without having to define an exhaustive set of trap definitions in a MIB. Further, the mechanism enables remote monitoring of the health or condition of a network device rather than simply monitoring of network traffic through a device.

Accordingly, the present invention resides in a computer network having a multiplicity of devices, including a digital processor coupled to the network for communication among the devices, the digital processor serving as a system management station for managing the network devices. Apparatus for monitoring status of a network device comprises a processor assembly coupled to a subject network device and a data memory member accessible by the processor assembly for indicating user-defined alarm thresholds of the subject device. The processor assembly obtains threshold data from the data memory member and compares current status to the obtained threshold data. Upon a threshold being met by the current status, the processor assembly transmits an indication of threshold condition of the subject device to the system management station across the network. The data memory member is a database formed of a plurality of records defined by a MIB.

According to one aspect of the invention, a local handler can be invoked upon the threshold being met.

According to another aspect of the invention, an alarm threshold or trap can be set for any MIB variable using a table mechanism. Each alarm threshold is set as a record or instance in an alarm threshold table.

According to another aspect of the invention, a trap defined by an alarm threshold record can persist over a restart of the network device or agent.

According to still another aspect of the invention, the threshold record includes a descriptor variable comprising a descriptor string for authenticating a trap over restart of the network device or agent.

According to yet another aspect of the invention, the alarm threshold record includes an alarm type operator for comparison.

According to another aspect of the invention, the alarm threshold record associates a severity level with a trap.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views.

DETAILED DESCRIPTION OF THE PREFERRED EMBODIMENT

Figure 1:
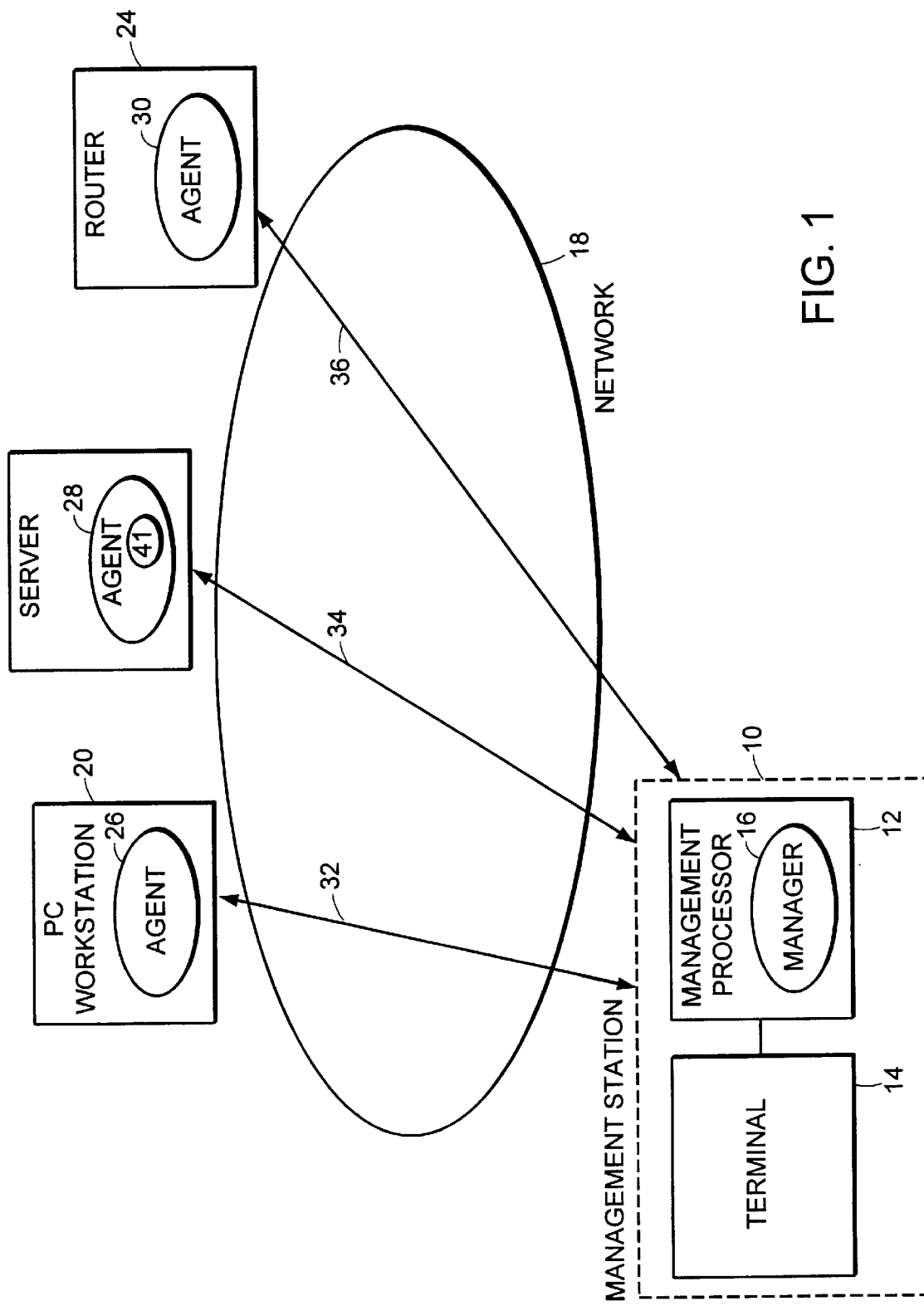
FIG. 1 is a schematic block diagram showing a management system in accordance with the present invention.

Referring now to FIG. 1, a preferred embodiment of a system illustrating the principles of the present invention is there shown. The system generally comprises a management station 10 coupled across a network 18 to plural network elements 20, 22, and 24. The network elements or devices include a PC workstation 20, a network server 22, and a network router 24. Other network elements can include host computers, bridges, telecommunication nodes, and any other network device. The network 18 is a communication network that operates using datagram transport, such as the User Datagram Protocol/Internet Protocol (UDP/IP) stack. The management station 10 communicates with the network elements 20, 22, 24 across network connections 32, 34, 36, respectively.

The management station 10 includes a management processor 12 and a terminal 14. The terminal 14 provides a user interface for a user to interact with a management software application 16 running on management processor 12. Each of the network elements includes an agent software application 26, 28, and 30, respectively, which monitors and accumulates operational data and detects exceptional events. The manager 16 requests the operational data or receives event notifications from the agents 26, 28, 30 using the SNMP management protocol across the network connections 32, 34, 36. The management station is further equipped to interpret the operational data and event information to effect control of network operations, which is an area that is beyond the scope of this specification.

In the preferred embodiment of the present invention, the server 22 and management station 10 run a Microsoft Windows NT platform version of ServerWORKS Manager 2.0 software provided by Digital Equipment Corporation, assignee of the present invention. The invention can also be implemented on other platforms including SCO Unix, Novell Netware, and others. It should be noted that the SNMP agents, described further below, are independent of the management software running on the management station 10.

As noted above, an agent uses a MIB which defines management data by specifying the data variables a network device must keep, including the names of the data variables and the syntax used to express those names. The present invention is concerned with providing a flexible and extensible mechanism for monitoring variables and conditions associated with a network element such as server 22. In order to provide such a mechanism, the preferred embodiment defines a so-called "private" or extension MIB called the svrmgt MIB 41.

Figure 2:
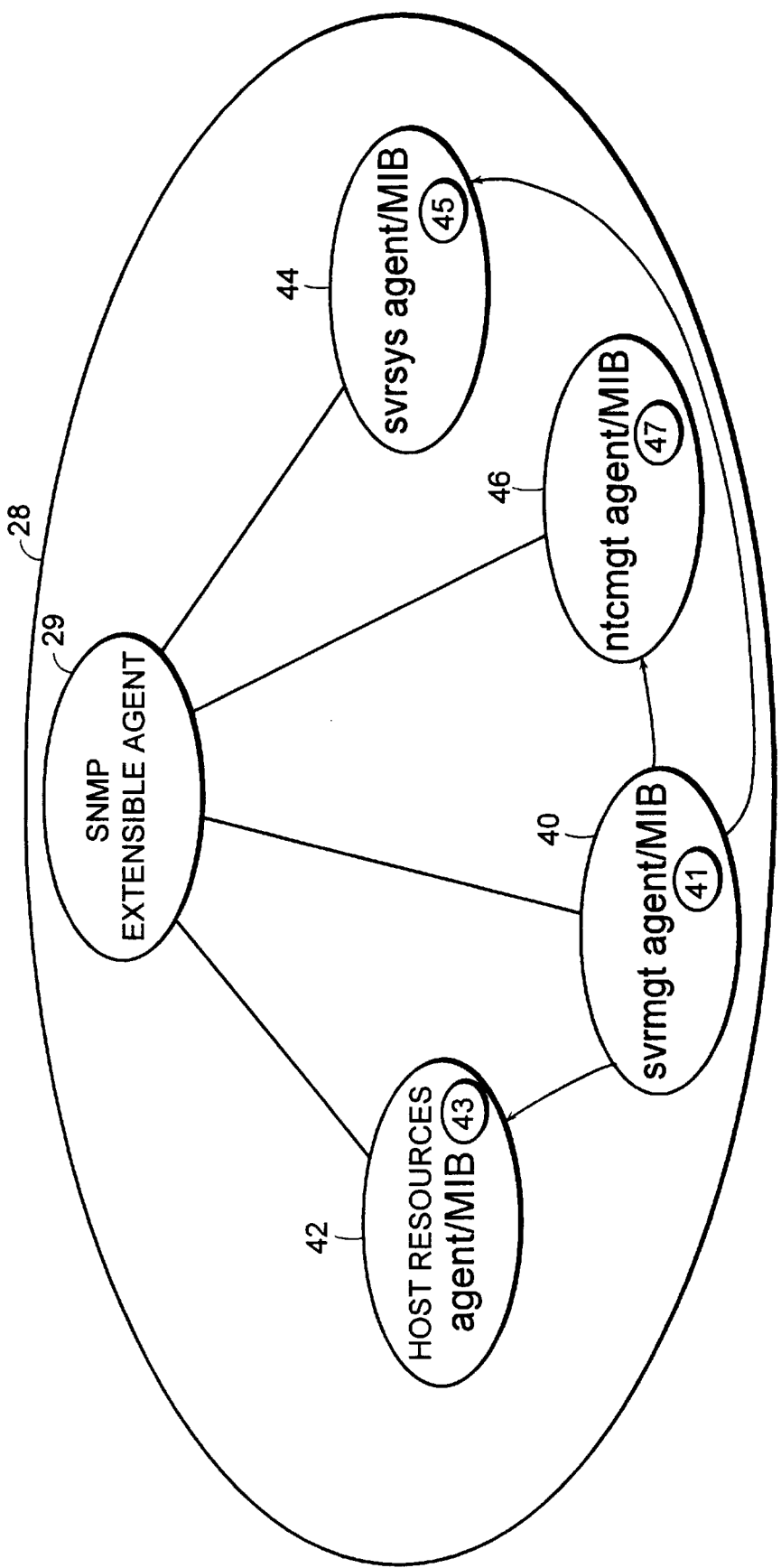
FIG. 2 is a block diagram showing the relationship among the agent/MIBs in a preferred embodiment of the invention.

The svrmgt MIB 41 is accessible by the agent 28 running on the server 22. FIG. 2 shows the agent 28 which comprises several agents working together. In the preferred embodiment of the invention, the agent 28 includes a Windows NT SNMP agent 29 provided by Microsoft Corporation. The NT SNMP agent 29 is a so-called extensible agent which transmits and receives SNMP messages over the network to and from the manager 16 running on the management processor 12. Agents, designated as svrmgt, host resources, svrsys, and ntcmgt agents then function as extension agents of the NT SNMP 29 agent by receiving requests, completing the requests, and sending information back to the NT SNMP agent 29. The svrmgt agent/MIB 40 provides thresholding of variables associated with a host resources agent/MIB 42, a svrsys agent/MIB 44, and a ntcmgt agent/MIB 46. The host resources MIB 43 is a predefined standard MIB (P. Grillo and S. Waldbusser, "Host Resources MIB", RFC 1514, September 1993) that defines data variables for managing host computers. Managed data variables that are defined by the host resources MIB 43 include the length of time the system has been up; the number of errors on a particular device, such as a hard drive; the load on a particular processor; printer status; and the type and status of installed software. The svrsys and ntcmgt MIBs 45, 47 are "private" or extension MIBs defined by Digital Equipment Corporation, assignee of the present invention. The svrsys MIB 45 defines hardware specific information for both Intel and Alpha processor platforms. Managed data variables include the type of system, such as Windows NT; the type of processor and processor utilization; memory configuration, type, and available paging memory; thermal and voltage sensor information; and fan status. The ntcmgt MIB 47 supports NT cluster software and defines data variables such as software status; group control information; type of policy for selecting a primary server; and the object type (e.g., disk, sql) for a particular object.

The SMI standard specifies that MIB variables must be defined and referenced using Abstract Syntax Notation 1

Figure 3A:
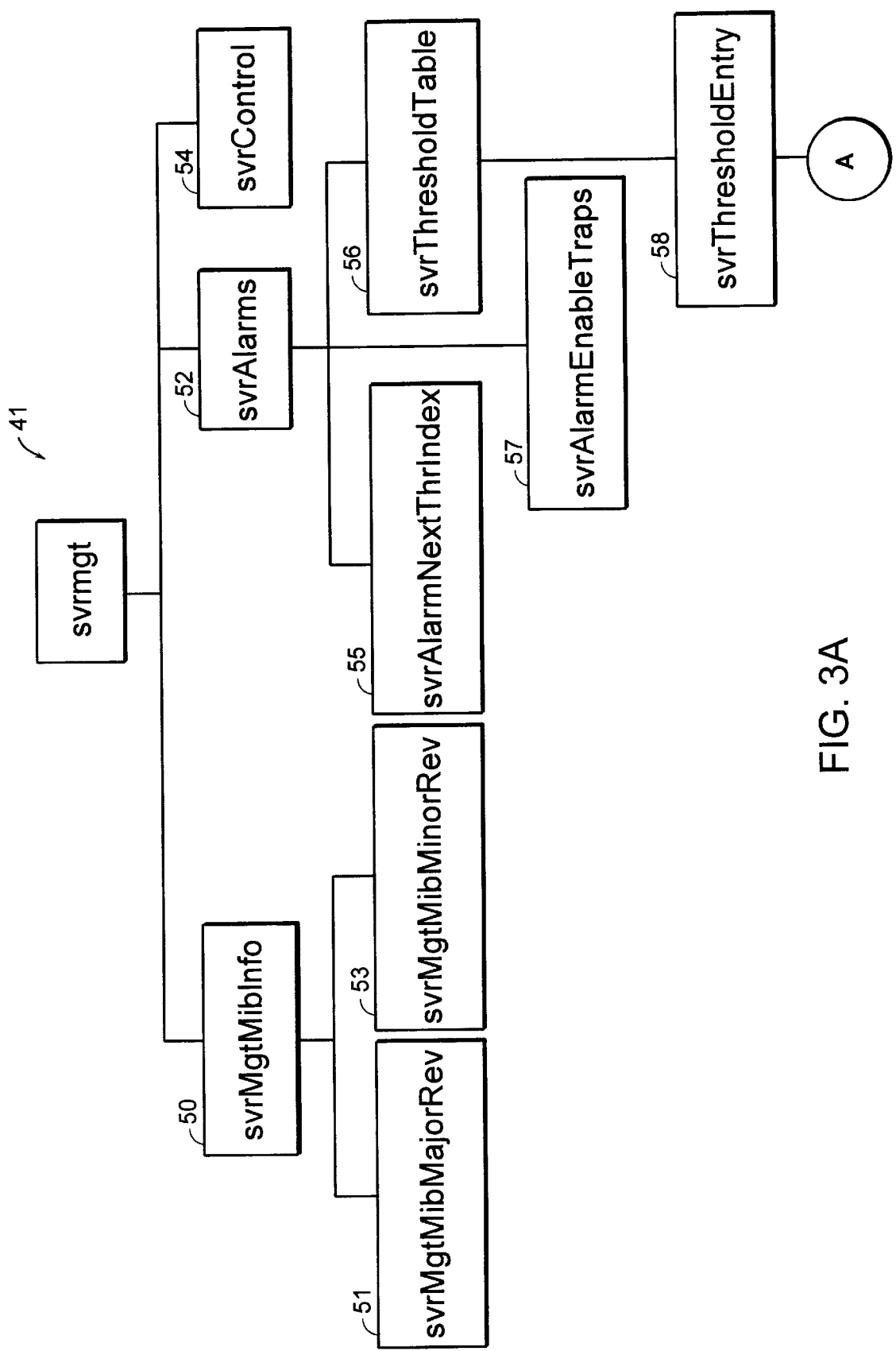
FIGS. 3A and 3B show a directory tree and an object identifier namespace for the svrmgt MIB in accordance with the present invention.
Figure 3B:
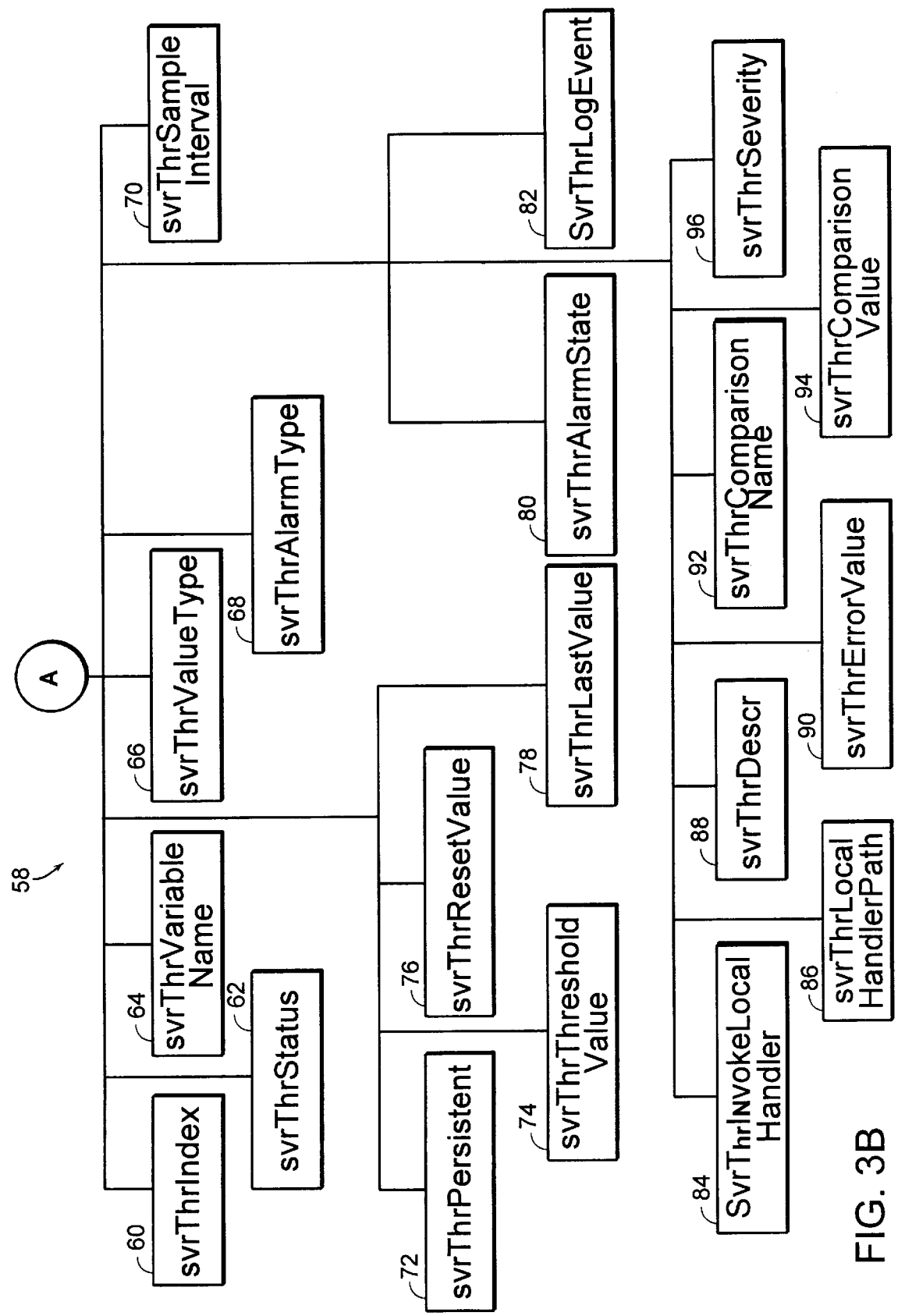

(ASN.1), a formal language for representing data items and names. MIBs are defined in a global hierarchical object identifier namespace using ASN.1. The svrmgt MIB 41 of the preferred embodiment is defined under the iso.org.dod-.internet.private.enterprises subtree using ASN.1. The directory tree and object identifier namespace of the svrmgt MIB 41 are shown in FIGS. 3A and 3B.

The svrmgt MIB 41 will now be described in detail with reference to FIGS. 3A and 3B. There are three groups defined in the svrmgt MIB: svrMgtMibInfo 50, svrAlarms 52, and svrcontrol 54. The svrMgtMibInfo group 50 provides the current status of the svrmgt MIB 41. The svrcontrol group 54 provides parameters to control local server behavior. The svrAlarms group 52 describes locally-generated alarms and their disposition. It is the svrAlarms group 52 which provides the mechanism for flexibly configuring a trap based on any MIB variable without having to define an exhaustive set of trap definitions. It should be noted that "any MIB variable" means any variable that resolves to an ASN.1 primitive type of INTEGER (i.e., INTEGER, Boolean, Counter, Gauge, and TimeTicks).

In the svrAlarms group 52, a svrThresholdTable 56 provides a table of thresholds against which the svrmgt agent 40 monitors. The svrThresholdTable table 56 describes conditions (i.e. thresholds) for setting and resetting alarms. The thresholds are defined in records, one threshold record per svrThresholdEntry 58 of the svrThresholdTable 56. A svrAlarmNextThrIndex variable 55 is used to name the instances or records of the svrThresholdTable 56. The svrThresholdEntry 58 is a record which contains the following variables as illustrated in FIG. 3B (A program listing of the svrThresholdTable 56 is provided further below):

svrThrIndex 60: provides a locally unique index value.

svrThrStatus 62: describes the status of the record or instance.

svrThrVariableName 64: the object identifier of a particular variable to be tested against a threshold.

svrThrValueType 66: the method of calculating the value to be compared to the threshold. If the value of this variable is absoluteValue(1), then the value of the specified svrThrVariableName is compared directly with the threshold. If the value of this variable is deltaValue(2), then the last value of svrThrVariableName is subtracted from the current value, and the difference is compared with the threshold.

svrThrAlarmType 68: specifies the mathematical operator used for comparison of the current value to the threshold. The operators include >, >=, =, <=, and <.

svrThrSampleInterval 70: the alarm interval in seconds between polls to check for threshold exceptions.

svrThrPersistent 72: a flag which when set (i.e. has value "true"), the threshold persists across restart of the agent.

svrThrThresholdValue 74: the thresholding value which gets compared to the current or delta value.

svrThrResetValue 76: the value that on all operators of the svrThrAlarmType except for "equal" (i.e. =), is used to reset the threshold.

svrThrLastValue 78: the previous sample which is used to evaluate whether an alarm should be triggered or to evaluate delta values for threshold checking.

svrThrAlarmState 80: indicates whether the alarm is currently in the set or reset state.

svrThrLogEvent 82: a flag if set to true, logs to a system event log.

svrThrInvokeLocalHandler 84: a flag if set to true, invokes a local alarm handler and passes the trap structure.

svrThrLocalHandlerPath 86: indicates a pathname of local alarm handler.

svrThrDescr 88: describes the type of threshold.

svrThrErrorValue 90: defines an SNMP error status associated with the svrThrStatus 62.

svrThrComparisonName 92: the object identifier to a descriptor attribute that can be used with the persistence feature to verify that the svrThrVariableName instance is correct.

svrThrComparisonValue 94: data value of svrThrComparisonName.

svrThrSeverity 96: indicates the severity of the threshold.

As noted above, each threshold defined using the svrmgt MIB 41 structure constitutes a record or instance. An array of pointers is created for pointing to the threshold records in memory. The svrmgt agent 40 includes three different threads of execution: main, comparison, and threshold threads. The main thread performs the SNMP requests on the records in the threshold array. The comparison thread, described further below, is initiated on agent restart and implements the persistence aspect of the present invention. The threshold thread, also described further below, works on records in the threshold array that have been enabled, performing polling and comparison functions and sending traps as needed.

The comparison and threshold execution threads of the svrmgt agent 40 can be better understood by illustrating an example threshold record for sending a trap in the case of a failed CPU board fan on the server 22. In that case, fan status equals "failed". Referring again to FIG. 1, a user at management station 10 enters commands in a higher level application program which the manager 16 translates to SNMP get and set commands towards the server 22. In the first step, the value of the svrAlarmNextThrIndex 55 provides a key which is used to identify the subject threshold record 58 in the svrThresholdTable 56. Using this key to identify the threshold table entry, the following threshold record 58 attributes can be set:

set svrThrStatus=undercreation(1)

set svrThrVariableName=1.3.6.1.4.1.36.2.18.2.8.2.2.1.3.1 set svrThrAlarmType=equalTo(3)

set svrThrPersistent=true(1)

set svrThrThresholdValue=failed(4)

set svrThrResetValue=failed(4)

set svrThrDescr="This is a fan status threshold set to alarm if the value equals failed."

set svrThrComparisonName=1.3.6.1.4.1.36.2.18.2.8.2.2.1.2.1 set svrThrcomparisonValue="The fan on cpu board #1"

set svrThrSeverity=high(1)

set svrThrStatus=rowEnabled(3)

Note that the object identifiers specified above for svrThrVariableName=1.3.6.1.4.36.2.18.2.8.2.2.1.3.1 and svrThrComparisonName=1.3.6.1.4.36.2.18.2.8.2.2.1.2.1 are in accordance with the globally unique object identifier namespace hiearchy.

Figure 4:
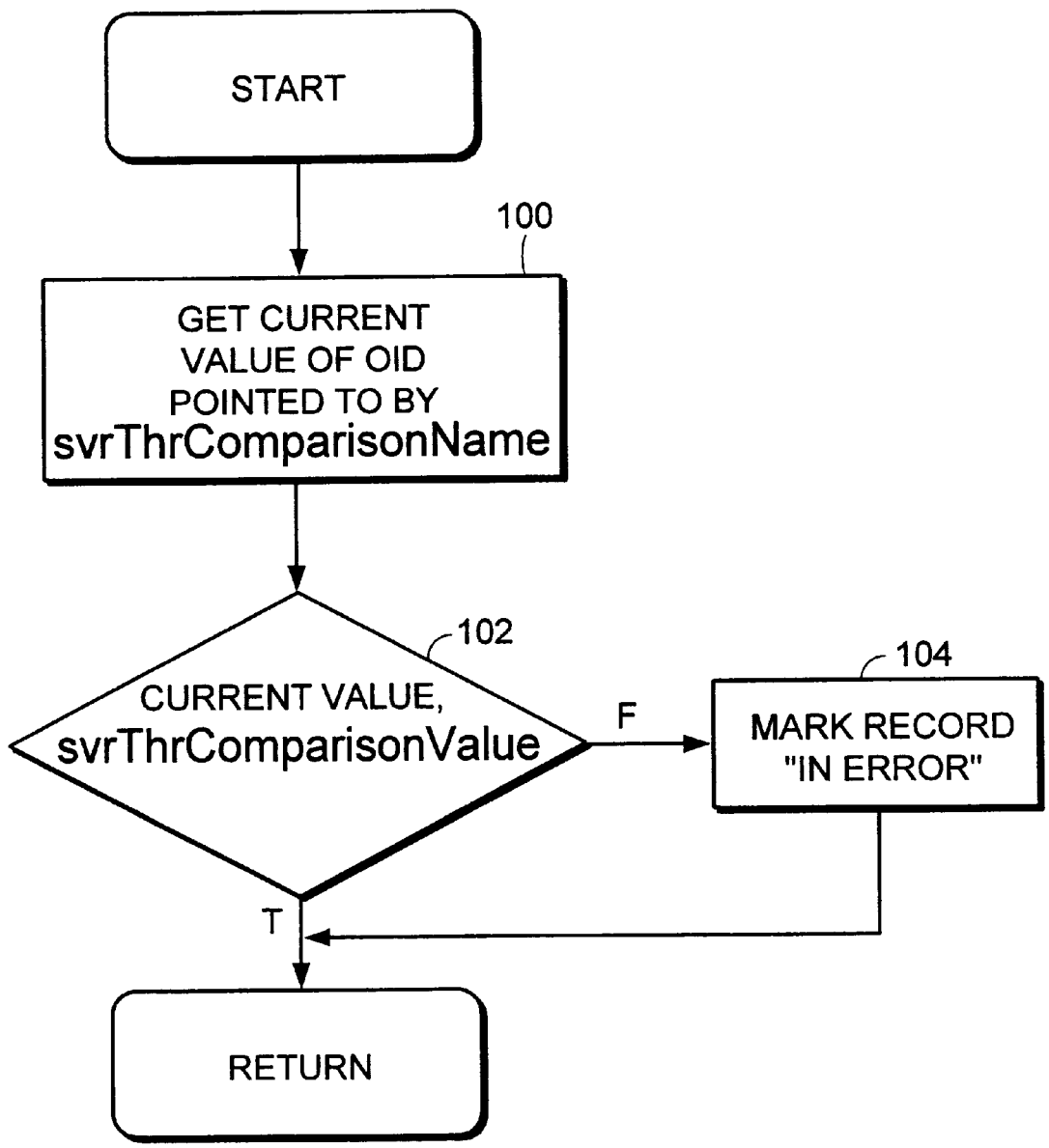
FIG. 4 is a flow diagram of the comparison execution thread of the svrmgt agent in accordance with the present invention.

An important aspect of the present invention is the persistence feature which provides for verification of instances or records in the svrThresholdTable 56. In the preferred embodiment, the persistence feature is implemented using the svrThrPersistent, svrThrComparisonName, and svrThrComparisonValue variables. When the threshold record 58 is created, the management station 10 gets the value of the object identifier pointed to by the svrThrComparisonName variable 92. The svrThrComparisonName variable 92 points to an ASCII text string that can be used to uniquely identify the item or instance being thresholded. That ASCII text string value is then placed into the svrThrComparisonValue variable 94 using a set command. Referring now to FIG. 4, a flow diagram of the comparison execution thread of the svrmgt agent 40 is shown and will be described in relation to the above example record 58. Upon a restart of the agent on server 22, the svrmgt agent 40 steps through threshold records 58. For each record, the agent at step 100 gets the current value of the object identifier pointed to by the svrThrComparisonName variable 92. The agent then compares the current value of svrThrComparisonName 92 with the svrThrComparisonValue 94 at step 102 to ensure that the correct object is being polled. For example, consider the case where the fan status threshold had been set for a second CPU board, the server had been shut down, the board removed, and the server rebooted. In that case, the value comparison of the current value of svrThrComparisonName 92 with the svrThrComparisonValue 94 would be false and the svrmgt agent 40 would mark the record 58 to an "in error" state at step 104.

Figure 5:
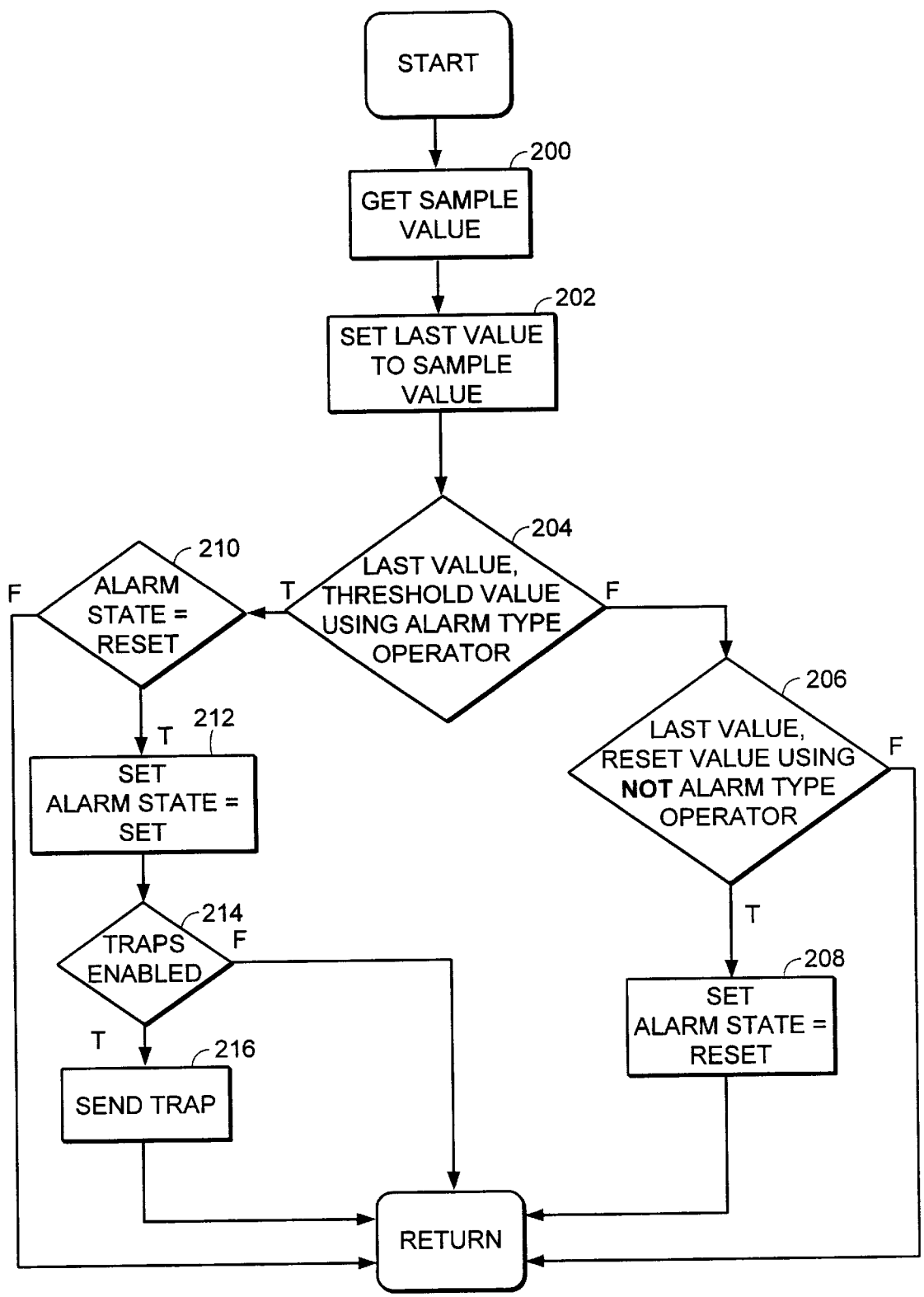
FIG. 5 is a flow diagram of the threshold execution thread of the svrmgt agent in accordance with the present invention.

Referring to FIG. 5, a flow diagram of the threshold execution thread of the svrmgt agent 40 is shown and will now be described in relation to the above example record 58.

The svrmgt agent 40 begins polling by getting the current value for the attribute pointed to by svrThrVariableName variable 64 at step 200. The svrThrLastValue variable 78 is then set to the current sample value at step 202. At step 204, the svrmgt agent 40 compares that value to the value of the svrThrThresholdValue variable 74 using the mathematical operator that was set in the svrThrAlarmType variable 68. In the example, the mathematical operator is an equalTo operator, which means that if the fan status equals failed (svrThresholdvalue=4), a possible alarm condition exists. Before a trap can be sent, however, the alarm state is checked at step 210. If the state of svrThrAlarmState 80 is in the reset state, then at step 212 the alarm state is changed to the set state. The svrmgt agent 40 then checks whether traps are enabled at step 214. If traps are enabled, a trap is sent at step 216 at the severity level set in the record 58 by the svrThrSeverity variable 96. In the example, a high level trap is sent to the management station. Thus, the svrThrSeverity variable 96 enables different severity levels to be indicated in different traps. Upon receipt of the trap, the management station 10 interprets the severity level of the trap and responds appropriately. In contrast, traps of the prior art lacked any indication of degree or level of severity.

If the alarm state at step 210 is in the set state, no trap is sent and polling continues. Whereas, at step 214, if traps are disabled, polling continues without a current trap being transmitted. If the comparison of the last sample value to the threshold value does not meet the condition (step 204), then at step 206 the last sample value is compared to the reset value of svrThrResetValue 76 using the Boolean NOT condition of the operator set in the svrThrAlarmType variable. If the comparison at step 206 meets the condition, then at step 208 the alarm state of svrThrAlarmState 80 is changed to the reset state.

In the example, if the fan status no longer equals failed(4), then svrThrAlarmState 80 is set to the reset state. Polling continues and if the fan status becomes failed again, another trap would be sent following the steps 210, 212, 214, and 216. This hysteresis mechanism provides an accurate or "true second" trap transmission as opposed to a repeated trap message on the same device state polled multiple times before the condition is remedied. It is important to note that such hysteresis on a status variable is not known to be possible with the RMON MIB.

There are applications where it can be advantageous to not implement hysteresis. For example, after an event such as a device failure has occurred and an initial trap has been sent, corrective action may be initiated at the management station. During the corrective action, additional trap messages associated with the same triggering event would be useful feedback to indicate whether and when the corrective action is successful. One way to avoid the hysteresis is for the svrmgt agent 40 to ignore the svrThrAlarmState alarm state variable 80.

When an alarm condition occurs and a trap has been sent, the management station may begin some type of corrective action as noted above. In addition, a local process or handler on the device itself can be invoked based on the occurrence of a trap to automatically begin corrective action. In the preferred embodiment, the svrmgt MIB variable svrThrInvokeLocalHandler 84 provides a flag for indicating whether to invoke or execute a local alarm handler located at the pathname specified in the variable svrThrLocalHandlePath 86.

The preferred embodiment has been shown with reference to a svrmgt MIB 41 that supports monitoring of three specific MIBs. It will be apparent to one skilled in the art that the principles of the invention can be readily applied to embodiments which support monitoring of any number and variety of MIBs.

A listing of the svrthresholdTable 56 is as follows:
svrThresholdTable OBJECT-TYPE
    SYNTAX SEQUENCE OF SvrThresholdEntry
    ACCESS not-accessible
    STATUS mandatory
    DESCRIPTION
    "Table of thresholds against which the agent should check for exceptions. This table describes conditions for setting and resetting alarms. Alarms may be set on absolute values—i.e. the current integer value of the sampled variable—or on delta values—i.e. the difference between the current or last value. Alarms may be GreaterThan exception alarms, LessThan exception alarms, EqualsTo alarms etc. See svrThrAlarmType for differences. Hysteresis is introduced by providing thresholds both for setting and resetting of the alarm state, thereby limiting the number of traps that will be sent on alarm triggering. Alarms may be created to persist across agent reboots, but this is not recommended for dynamic table variables. The triggering of an alarm will change a state variable in the conceptual row. It may also trigger the sending of a trap, the local logging of an event, or the triggering of a locally-defined action."
    ::={svrAlarms 3}
svrThresholdEntry OBJECT-TYPE
    SYNTAX SvrThresholdEntry
    ACCESS not-accessible
    STATUS mandatory
    DESCRIPTION
    "One threshold alarm set on some particular integer-valued variable. An alarm entry is created by the management console. It uses the current value of svrAlarmNextThrIndex to name the instances of the row variables, and sets its svrThrStatus to underCreation. When creating a threshold entry for the first time, issue a set request on svrThrStatus. The remaining row variables may be set in the same operation, or in subsequent operations. Those not set will have retain their default values as described. The following variable values MUST be set before enabling the alarm:
svrThrStatus must be set to underCreation
svrThrVariableName
svrThrThresholdValue"
INDEX {
  svrThrIndex
}
::={svrThresholdTable 1}
SvrThresholdEntry ::=
  SEQUENCE {
    svrThrIndex
      INTEGER,
    svrThrStatus
      INTEGER,
    svrThrVariableName
      OBJECT IDENTIFIER,
    svrThrValueType
      INTEGER,
    svrThrAlarmType
      INTEGER,
    svrThrSampleInterval
      INTEGER,
    svrThrPersistent
      Boolean,
    svrThrThresholdValue
      INTEGER,
    svrThrResetValue
      INTEGER,
    svrThrLastValue
      INTEGER,
    svrThrAlarmState
      INTEGER,
    svrThrLogEvent
      Boolean,
    svrThrInvokeLocalHandler
      Boolean,
    svrThrLocalHandlerPath
      DisplayString,
    svrThrDescr
      DisplayString,
    svrThrErrorValue
      SnmpErrors,
    svrThrComparisonName
      OBJECT IDENTIFIER,
    svrThrComparisonValue
      DisplayString,
    svrThrSeverity
      Severity
  }
svrThrIndex OBJECT-TYPE
  SYNTAX INTEGER
  ACCESS read-only
  STATUS mandatory
  DESCRIPTION
    "A locally-unique index value. On creation, this should be set to the value of svrAlarmNextThrIndex."
  ::={svrThresholdEntry 1}
svrThrStatus OBJECT-TYPE
  SYNTAX INTEGER {
    undercreation(1)
    rowInvalid(2),
    rowEnabled(3),
    rowDisabled(4)
    rowError(5)
  }
  ACCESS read-write
  STATUS mandatory
  DESCRIPTION
    "This variable describes the status of the row. When the row is created with the initial set, svrThrStatus must be set to underCreation. When the management console has completed row setup, it should set this variable to rowEnabled. Variables in the row may only be written if svrThrStatus is in the initial undercreation state or has been set to rowDisabled.
    To delete the row, set the status to rowinvalid. It is a local implementation matter whether the row is actually removed from the table. Management applications must be prepared to ignore rows with a status of rowinvalid.
    Errors in variable polling and threshold checking that are determined by local implementation to be non-correctable will cause a row status change to rowError. Once the status is set to rowError by the agent, the agent will not reset it. Instead, it is up to the management console to reset the status based on information returned via svrThrErrorValue or for other reasons."
  {svrThresholdEntry 2}
svrThrVariableName OBJECT-TYPE
  SYNTAX OBJECT IDENTIFIER
  ACCESS read-write
  STATUS mandatory
  DESCRIPTION
    "The OID of an integer-valued variable to be tested against this threshold. On row creation, this variable will equal the value 0.0, and must be set to the OID of an integer-valued variable before enabling the alarm. It's possible to get an error setting this due to invalid oid (may not support thresholding on this oid due to data type perhaps) or that we couldn't access the agent that supports this oid."
  ::={svrThresholdEntry 3}
svrThrValueType OBJECT-TYPE
  SYNTAX INTEGER {
    absolutevalue(1)
    deltaValue(2)
  }
  ACCESS read-write
  STATUS mandatory
  DESCRIPTION
    "This is an absolute value or a delta value. Default on row creation is absolutevalue. The deltavalue is calculated by taking the current value and subtracting svrThrLastValue. The difference may be negative allows for thresholding on negative changes."
  ::={svrThresholdEntry 4}
svrThrAlarmType OBJECT-TYPE
  SYNTAX INTEGER {
    greaterThan(1)
    greaterThanOrEqualTo(2)
    equalTo(3),
    lessThanOrEqualTo(4)

lessThan(5)
}
ACCESS read-write
STATUS mandatory
DESCRIPTION
"This is a greater than, greater than or equal to, equal to, less than or equal to, or less than alarm.
Greater Than or Greater Than or Equal To thresholds for absolute values occur when the sample value exceeds (or equals) the svrThrThresholdValue and svrThrAlarmState was reset. This will cause the svrThrAlarmState to be set and, if svrAlarmEnableTraps is true, a svrThrExceptTrap will be sent.
SvrThrAlarmState will be reset when the sample value falls below or equals svrThrResetValue. For delta values, the same holds true except the difference between the sample value and the svrThrLastValue is used for comparison with both the svrThrThresholdValue and the svrThrResetValue.
Less Than or Less Than or Equal To thresholds for absolute values occur when the sample value falls below (or equals) the svrThrThresholdValue and svrThrAlarmState was reset. This will cause the svrThrAlarmState to be set and, if svrAlarmEnableTraps is true, a svrThrExceptTrap will be sent. SvrThrAlarmState will be reset when the sample value exceeds or equals svrThrResetValue. For delta values, the same holds true except the difference between the sample value and the svrThrLastValue is used for comparison with both the svrThrThresholdvalue and the svrThrResetValue.
Equal To thresholds for absolute values occur when the sample value equals svrThrThresholdValue and svrThrAlarmState was reset. This will cause the svrThrAlarmState to be set and, if svrAlarmEnableTraps is true, a svrThrExceptTrap will be sent. SvrThrAlarmState will be reset when the sample value does not equal svrThrResetValue. For delta values, the same holds true except the difference between the sample value and the svrThrLastValue is used for comparison with both the svrThrThresholdValue and the svrThrResetValue.
NOTE—It is possible to have negative delta values since the difference is computed as the current value minus the svrThrLastValue.
The default value on row creation is GreaterThan."
::={svrThresholdEntry 5}
svrThrSampleInterval OBJECT-TYPE
SYNTAX INTEGER
ACCESS read-write
STATUS mandatory
DESCRIPTION
"Interval in seconds between polls to check for threshold exceptions. The default value on row creation is implementation-specific.
Minimum Value is 1."
::={svrThresholdEntry 6}
svrThrPersistent OBJECT-TYPE
SYNTAX Boolean
ACCESS read-write
STATUS mandatory
DESCRIPTION
"True if this threshold should persist across agent restarts. Default value on row creation is FALSE."
::={svrThresholdEntry 7}
svrThrThresholdValue OBJECT-TYPE
SYNTAX INTEGER
ACCESS read-write
STATUS mandatory
DESCRIPTION
"This is the thresholding value which gets compared to the current or delta value. Default on row creation is 0."
::={svrThresholdEntry 8}
svrThrResetValue OBJECT-TYPE
SYNTAX INTEGER
ACCESS read-write
STATUS mandatory
DESCRIPTION "This is the value that on all svrThrAlarmTypes except for equalTo, is used to reset the threshold. Default on row creation is 0"
::={svrThresholdEntry 9}
svrThrLastValue OBJECT-TYPE
SYNTAX INTEGER
ACCESS read-only
STATUS mandatory
DESCRIPTION
"Saved previous sample; needed to evaluate if alarm should be triggered or to evaluate delta values for threshold checking."
::={svrThresholdEntry 10}
svrThrAlarmState OBJECT-TYPE
SYNTAX INTEGER {
  Set(1)
  Reset(2)
}
ACCESS read-only
STATUS mandatory
DESCRIPTION
"Whether this alarm is currently set or reset. This variable is used by polling management applications to determine if a threshold exception state has been detected based on this alarm definition. It will initially have a value of reset when the alarm is enabled or the agent is restarted. For state change rules look at the definition for svrThrAlarmType.
In all cases, this value will reset on svrThrStatus change to rowDisabled or rowinvalid."
::={svrThresholdEntry 11}
svrThrLogEvent OBJECT-TYPE
SYNTAX Boolean
ACCESS read-write
STATUS mandatory
DESCRIPTION
"If yes, log to the system event log. Default value is False."
::={svrThresholdEntry 12}
svrThrInvokeLocalHandler OBJECT-TYPE
SYNTAX Boolean
ACCESS read-write
STATUS mandatory
DESCRIPTION
"If true, invoke a local alarm handler, passing trap structure. Mechanism is a local issue."
::={svrThresholdEntry 13} svrThrLocalHandlerPath OBJECT-TYPE
    SYNTAX DisplayString
    ACCESS read-write
    STATUS mandatory
    DESCRIPTION
        "Pathname of local alarm handler. If not implemented, value will be null."
    ::={svrThresholdEntry 14}
svrThrDescr OBJECT-TYPE
    SYNTAX DisplayString
    ACCESS read-write
    STATUS mandatory
    DESCRIPTION
        "This attribute is used to describe the type of threshold. This is set by the management console not by the agent."
    ::={svrThresholdEntry 15}
svrThrErrorValue OBJECT-TYPE
    SYNTAX SnmpErrors
    ACCESS read-only
    STATUS mandatory
    DESCRIPTION
        "This is the SNMP defined error status which caused the svrThrStatus value to become equal to rowError.
        Only valid at that time."
    ::={svrThresholdEntry 16}
svrThrComparisonName OBJECT-TYPE
    SYNTAX OBJECT IDENTIFIER
    ACCESS read-write
    STATUS mandatory
    DESCRIPTION
        "An OID to a descriptor attribute which can be used with persistent to verify that the svrThrVariableName instance is correct. On agent restarts the value for this oid will be retrieved and compared to the svrThrComparisonValue. If not equal, then it's possible that the oid instancing for svrThrVariableName is incorrect.
        If this occurs, then the svrThrStatus will be set to rowError and the svrThrErrorValue will be set to badvalue. This attribute is optional. The default value is 0.0. Can be reset back to 0.0 if this attribute is not to be used."
    ::={svrThresholdEntry 17}
svrThrComparisonValue OBJECT-TYPE
    SYNTAX DisplayString
    ACCESS read-write
    STATUS mandatory
    DESCRIPTION
        "Data value of svrThrComparisonName—used when persistent is set. This value is compared to the current value on agent restarts. This attribute is optional. The default value is NULL"
    ::={svrThresholdEntry 18}
svrThrSeverity OBJECT-TYPE
    SYNTAX Severity
    ACCESS read-write
    STATUS mandatory
    DESCRIPTION
        "Indicates the severity of the threshold. Default on row creation is informational."
    ::={svrThresholdEntry 19}

EQUIVALENTS

While this invention has been particularly shown and described with references to preferred embodiments thereof, it will be understood by those skilled in the art that various changes in form and details may be made therein without departing from the spirit and scope of the invention as defined by the appended claims.

What is claimed is:

1. In a computer network having a system management station and a plurality of network devices, a method for monitoring a selected network device comprising the steps of:
    coupling an agent to the selected network device for monitoring current status of a device object and communicating the status to the system management station;
    providing a data memory member accessible by the agent for storing attributes of the device object in a threshold record;
    setting a comparison name attribute in the threshold record to an object identifier;
    obtaining a value of the object identifier and setting a comparison value attribute in the threshold record to the obtained value;
    upon a restart of the agent, verifying persistence of the threshold record by:
        obtaining a current value of the object identifier set in the comparison name attribute;
        comparing the current value of the object identifier to the set value of the comparison value attribute; and
        setting an error indication in the threshold record upon the comparison not being met.

2. The method of claim 1 wherein the device object status comprises at least two enumerated states.

3. The method of claim 1 wherein the object identifier value is a descriptor string.

4. In a computer network having a system management station and a network device, a method comprising the steps of:
    coupling an agent to the network device for monitoring current status of a device object and communicating the status to the system management station, wherein the device object comprises a multistate status variable having at least two enumerated states, each state represented by an integer data value;
    providing a data memory member accessible by the agent having a user-definable threshold value associated with the device object;
    obtaining a sample value of the multistate status variable representing current status of the device object from the network device;
    obtaining the threshold value from the data memory member and comparing the sample value to the threshold value using a user-definable alarm type operator;
    upon the threshold being met by the sample value, when an alarm status associated with the device object is in a reset state, setting the alarm status to a set state and transmitting an indication of threshold condition of the device object to the system management station; and
    upon the threshold not being met by the sample value, obtaining a reset value from the data memory member and comparing the sample value to the reset value using a Boolean NOT function of the alarm type operator and upon the Boolean NOT function comparison being met, setting the alarm status to the reset state.

5. The method of claim 4 wherein the alarm type operator is a selected from the group consisting of >=, >, =, <, and <=.

6. The method of claim 4 wherein the transmitting step comprises the step of transmitting a network management protocol message to the system management station to indicate threshold condition of the device object.

7. The method of claim 6 wherein the message includes an indication of severity of the threshold condition.

8. The method of claim 4 further comprising the step of invoking a local handler upon the threshold being met.

* * * * *